Patented Dec. 31, 1946

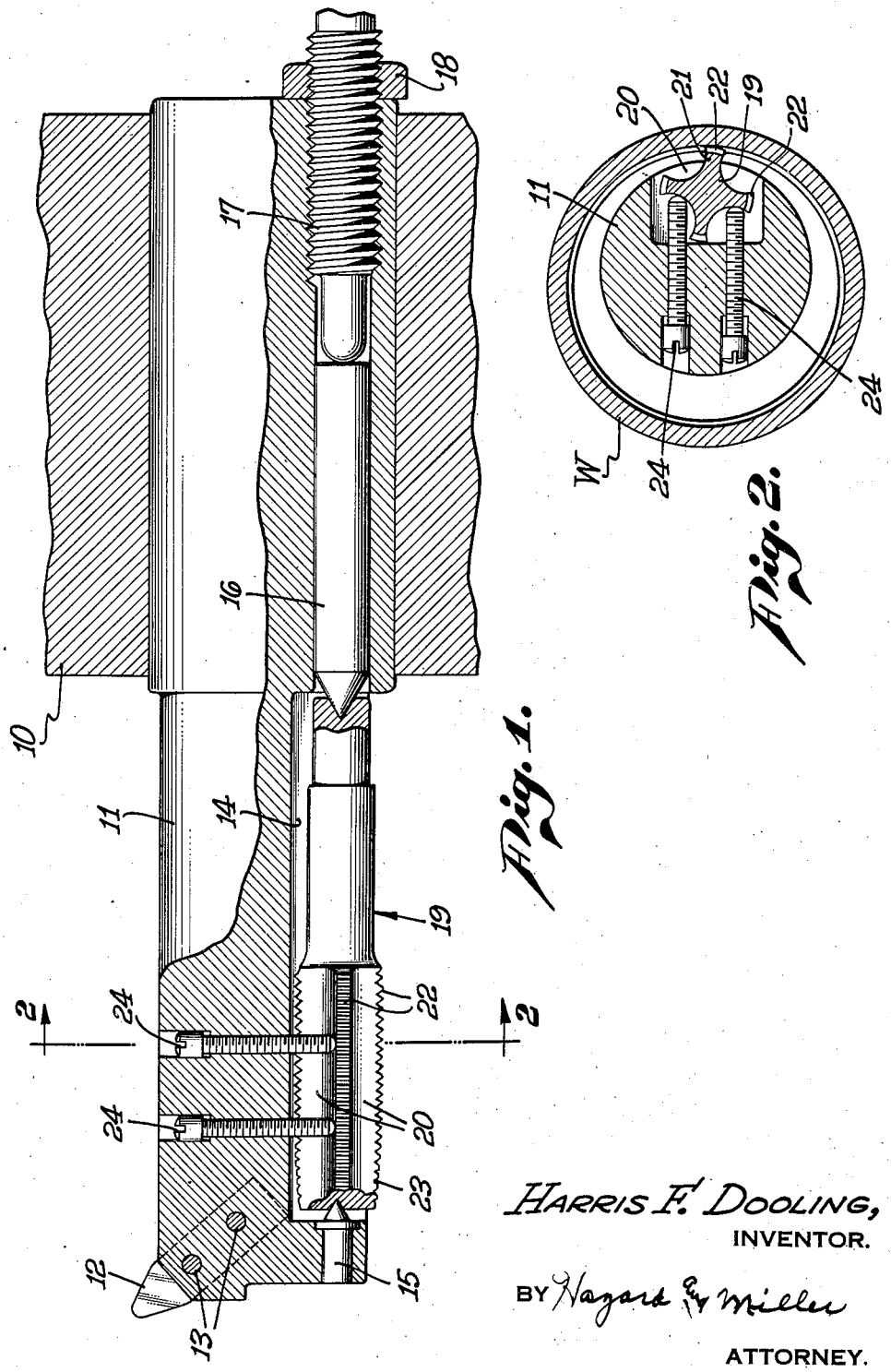

2,413,406

UNITED STATES PATENT OFFICE 2,413,406

THREAD CUTTER

Harris F. Dooling, Culver City, Calif.

Application February 28, 1944, Serial No. 524,329

5 Claims. (Cl. 10—101)

This invention relates to a means and method of cutting threads, and is especially useful in cutting precision threads on the interior of extremely hard alloys and like metals.

In cutting threads, particularly internal threads on very hard alloys, a number of difficulties have been experienced in attempting to secure precision threads that are smoothly formed, highly accurate in shape, and meeting small tolerances. In attempting to grind such threads the grinding wheel must of necessity have a relatively small diameter in order to enter the bore in which the threads are to be formed. Consequently, the grinding wheel must be rotated at a rate of speed and due to the hardness of the alloy it quickly wears out of the desired shape. If the threads are cut by a "single point," such as a lathe tool mounted on a boring bar there is great danger of the point of the tool that cuts the root of the thread breaking off. Due to the fact that large clearance must be provided on the tool in order to cut the internal threads, the use of chasers also has not proved satisfactory in cutting precision threads on hard alloys.

The present invention concerns a novel method and mechanism whereby precision threads may be readily cut on hard alloys and very small tolerances easily kept.

More specifically, an object of the present invention is to provide a means and method wherein a precision tap is used to cut the threads, the tap being moved axially in a direction that is spaced from the axis of rotation of the work and at a speed commensurate with the pitch of the threads on the tap. In this manner, only the thread portions of the tap which are located on a portion thereof are utilized to make a cut and as the conventional tap has four ribs each equipped with thread portions, each tap thus provides four separate and independent cutters capable of being consecutively used for thread cutting. By means of the present invention accurately formed threads can be cut and tolerances maintained. An adequate chip throat is provided for the cuttings and adequate clearances are also provided. Danger of point breaking is also eliminated.

With the foregoing and other objects in view, which will be made manifest in the following detailed description and specifically pointed out in the appended claims, reference is had to the accompanying drawing for an illustrative embodiment of the invention, wherein:

Figure 1 is a top plan view of a boring bar embodying the present invention; and Fig. 2 is a transverse section taken substantially upon the line 2—2 upon Fig. 1, in the direction indicated but illustrating the boring bar as in thread-cutting position with the work.

Referring to the accompanying drawing wherein similar reference characters designate similar parts throughout, W indicates a tubular or cylindrical article constituting the work in which it may be desirable to cut internal precision threads. This article is chucked in a lathe in the conventional manner. I provide a suitable block 10 which is adapted to be mounted rigidly on the cross-compound of the lathe, this block serving to stationarily support a boring bar indicated at 11. Adjacent the forward end of this boring bar provision is made for mounting a suitable cutter 12 thereon, such as by forming a recess in the boring bar adapted to receive the cutter and providing set screws 13 for clamping the cutter in place. This cutter may be utilized to bore out the interior of the work W and to face it if desired. This cutter is mounted on the boring bar primarily for purposes of convenience and forms no part of the present invention other than that it enables the same boring bar to bore out and face the work after it has been chucked in the lathe without disturbing or replacing the boring bar 11 in the block 10. As illustrated, the cutter 12 is so located that in order to bore out and face the work the chuck must be reversely rotated in order to enable this operation.

The invention primarily concerns the means and method of cutting the threads on the interior of the work after it may have been bored out and faced by cutter 12. To this end one side of the boring bar is recessed as indicated at 14, and at the forward end of this recess there is mounted a center 15. In the other end of the recess there is mounted a center 16 that can be advanced toward center 15, such as by an adjusting screw 17. This adjusting screw when adjusted to proper position may be locked in the adjusted position, such as by a jamb nut 18. The two centers 15 and 16 are arranged in perfect alignment and on an axis parallel to the longitudinal central axis of the boring bar. These centers are adapted to have mounted thereon a precision tap indicated at 19. The precision tap employed is conventional having flutes 20 between ribs 21 on which thread portions 22 are formed. In accordance with conventional practice the forward thread portions are tapered or beveled off as indicated at 23. Screws 24 are threaded into the back of the boring bar and are engageable with flutes of the tap as shown in Fig. 2, to hold the tap rigidly in place and against rotation on the centers 15 and 16. Preferably there are four of such screws 24.

With the construction thus provided it will be noted that only one of the ribs 21 of the tap projects beyond the circumference of the boring bar. This rib constitutes the thread cutter.

Precision taps as now constructed are first shaped, then hardened, and finally ground. To this end, center holes are provided in the ends of the tap for mounting it during the formation of the tap and the final grinding operation. These center holes which are still present on a conventional tap are utilized to mount the tap between the centers 15 and 16, and as the precision tap has been ground perfectly with relation to these center holes, the mounting of the tap by means of the center holes on the centers assures that the tap will be in perfect parallelism with the longitudinal central axis of the boring bar once that the correct positions of the centers 15 and 16 have been established. Assuming that the work W has been chucked in the lathe, bored out and faced, the lead screw of the lathe is adjusted to feed the cross-compound longitudinally or toward the work at a speed commensurate with the pitch of the threads on the tap. Thus, if the tap is such as to form twenty threads per inch the lead screw is so adjusted as to bring about an advancement of the boring bar 1/20 of an inch for each rotation of the chuck. The cross-compound is adjusted so as to bring the projecting rib 21 into engagement with the work and the tap is then passed through the bore on the interior of the work W. Several consecutive cuts may be taken in order to complete the threads. Maintenance of the proper size of the threaded bore in the work W can be determined by reading the scale on the cross-feed of the cross-compound of the lathe. However, I find it advantageous to mount a micrometer dial for engagement with the block 10 to read the degree of feed of the tap against the work so that errors may not occur due to looseness in the cross-feed screw.

It will be noted from an inspection of Fig. 2 that the diameter of the tap has no relation to the diameter of the bore in the work W in which the threads are being cut. The diameter of the tap may be but a small fraction of the diameter of the bore in the work. If the tap is of a diameter which is only a small fraction of the diameter of the bore, this contributes to providing adequate clearance between the lower portions of the thread segments on the tap rib 21 and the internal threads, it being understood that the thread segments recede from the cutting edges of the tap on a small diameter, to wit, the diameter of the tap, and thus draw away from the large diameter threads that are being cut on the interior of the work. The flute next above the rib that is being utilized provides an adequate chip throat.

Inasmuch as the tap now conventionally made is of precision construction it assures that the threads cut on the work will be precision threads. I find that it is possible to cut threads with great accuracy on very hard alloys and to maintain close tolerances. If the alloy is extremely hard it of course tends to wear the thread segments on the ribs of the tap rather quickly and when the thread segments on one rib become severely worn screws 24 can be loosened and the tap turned a quarter turn on the centers 15 and 16 to thus bring into operation a succeeding rib. All four ribs on each tap can thus be consecutively utilized until they are all worn in which event the tap must be completely replaced.

In cutting cylindrical threads in the work W, the boring bar has its axis passed through the work in a direction absolutely parallel to the axis of rotation of the work.

If tapered threads are to be cut in the work W this is readily accomplished by adjusting the taper attachment on the lathe so that the cross-compound will be fed at a taper or at a slight angle to the axis of rotation of the work. In other respects the operation is the same.

While the invention is particularly adaptable to cutting internal threads it will of course be understood that it is not restricted thereto. It may be utilized to cut external threads in which case the projecting rib of the tap is merely brought into engagement with the exterior of the work and fed longitudinally with respect to the work by the lead screw at a speed commensurate with the pitch of the threads on the tap.

From the above-described method and apparatus it will be appreciated that I employ a conventional type of precision tap and provide a means for accurately mounting it on the cross-compound of the lathe. The tap is moved longitudinally with respect to the rotating work in a direction coincident with its own longitudinal axis and which is spaced from the axis of rotation of the work. In the event that the threads cut are cylindrical threads the axis of movement of the tap is spaced from the axis of rotation of the work but is parallel thereto. In the case of tapered threads the direction of movement of the tap is spaced from the axis of rotation of the work but is inclined to the axis of rotation of the work in accordance with the degree of taper.

The conventional tap not only has the tapered or starting thread portions 23 but usually a considerable number of finished or complete thread portions. I sometimes find it advantageous to grind off the excessive number of finished or complete thread portions on the ribs 21 as ordinarily only six or eight complete or finished thread portions are necessary. By grinding off the excessive number the length of movement required to make a complete pass of the tap through the work may be materially reduced.

It will also be noted that the same tap may be utilized to cut threads on the work of any diameter. Consequently, any available tap having the required number of threads per inch and capable of being accommodated in the boring bar can be utilized.

Various changes may be made in the details of construction without departing from the spirit and scope of the invention as defined by the appended claims:

I claim:

1. A device for cutting threads comprising a boring bar, and means for mounting a tap against rotation on the boring bar in such a manner that its longitudinal axis will be spaced from but parallel to the axis of the boring bar, and a tap mounted on said mounting means having one or more threaded rib portions projecting beyond the sides of the boring bar so as to be engageable with the work.

2. A device for cutting threads comprising a boring bar having a recess in the side thereof adapted to accommodate a tap, centers at the ends of the recess receivable in the center holes in the ends of the tap, a tap having center holes in the ends thereof supported on said centers and having one or more threaded rib portions, one of which projects beyond the sides of the boring bar so as to be engageable with the work and means on the boring bar for holding the tap against rotation on the centers.

3. A device for cutting threads comprising a boring bar having a recess in the side thereof adapted to accommodate a tap, centers at the ends of the recess receivable in the center holes in the ends of the tap, a tap having center holes in the ends thereof supported on said centers and having one or more threaded rib portions, one of which projects beyond the sides of the boring bar so as to be engageable with the work means on the boring bar for holding the tap against rotation on the centers, and means for adjusting one of the centers toward the other.

4. A device for cutting threads comprising a boring bar having a recess in the side thereof adapted to accommodate a precision tap, centers at the ends of the recess adapted to enter center holes in the ends of the tap, a tap having center holes in the ends thereof supported on said centers and having one or more threaded rib portions, one of which projects beyond the sides of the boring bar so as to be engageable with the work and screws extending through the back of the boring bar engageable with flutes of the tap to hold the tap against rotation on the centers.

5. A device for cutting threads comprising a boring bar having a recess in the side thereof adapted to accommodate a precision tap, centers at the ends of the recess adapted to enter center holes in the ends of the tap, and screws extending through the back of the boring bar engageable with flutes of the tap to hold the tap against rotation on the centers, said centers being so arranged that one threaded rib portion of the tap will project beyond the circumference of the boring bar.

HARRIS F. DOOLING.